US007274713B2

(12) United States Patent
Tatem, Jr. et al.

(10) Patent No.: US 7,274,713 B2
(45) Date of Patent: Sep. 25, 2007

(54) CELL SEQUENCE NUMBER SYNCHRONIZATION SYSTEM AND METHOD

(75) Inventors: James E. Tatem, Jr., Arlington, VA (US); Randy A. Drago, Gaithersburg, MD (US); Chi-Yu Lu, Somerset, NJ (US); Son Truong Ngo, Frederick, MD (US); Rong Zhang, Boyds, MD (US); Vahid Tabatabaee, Jessup, MD (US); Kirby Lee Nell, Harpers Ferry, WV (US)

(73) Assignee: Altera Corporation, San Jose, CA (US)

( * ) Notice: Subject to any disclaimer, the term of this patent is extended or adjusted under 35 U.S.C. 154(b) by 1141 days.

(21) Appl. No.: 10/231,217

(22) Filed: Aug. 30, 2002

(65) Prior Publication Data

US 2004/0042466 A1   Mar. 4, 2004

(51) Int. Cl.
*H04J 3/06* (2006.01)
(52) U.S. Cl. ...................... 370/509; 370/516
(58) Field of Classification Search ................ 370/509, 370/512–515
See application file for complete search history.

(56) References Cited

U.S. PATENT DOCUMENTS 5,361,277 A    11/1994   Grover
5,408,506 A    4/1995    Mincher et al.
5,790,608 A *  8/1998    Benayoun et al. .......... 375/356
5,959,980 A    9/1999    Scott
5,974,103 A    10/1999   Williams
6,081,650 A *  6/2000    Lyons et al. .................. 386/95
6,330,236 B1   12/2001   Ofek et al.

OTHER PUBLICATIONS

A 622-Mb/s bit/frame synchronizer for high-speed backplane datacommunication; Yoshimura, T. Kondoh, H. Matsuda, Y. Sumi, T.; This paper appears in: Solid-State Circuits, IEEE Journal of Publication Date: Jul. 1996 vol. 31, Issue: 7 On pp. 1063-1066.*
OC-12c digital crossconnect switch; Basch, B. Moolenbeek, R. Samalam, V.K. Procanik, M.J.; This paper appears in: Selected Areas in Communications, IEEE Journal on Publication Date: Feb. 1996 vol. 14, Issue: 2☐☐On pp. 346-352☐☐.*
Fast Switched Backplane for a Gigabit Switched Router; Nick McKeown; Department of Electrical Engineering☐☐Stanford University, Stanford, CA 94305-9030, 1999.*

(Continued)

*Primary Examiner*—Hassan Kizou
*Assistant Examiner*—Salman Ahmed
(74) *Attorney, Agent, or Firm*—Martine Penilla & Gencarella, LLP

(57) ABSTRACT

The present invention provides a system and method for enabling the synchronization of a switch and an interface device. Based on a comparison of cell sequence numbers included in cells received from the interface device to a current cell time within the switch, cell time adjustment information can be transmitted to the interface device. The cell time adjustment information is used by the interface device to determine the cell sequence number that is included in cells transmitted to the switch.

23 Claims, 11 Drawing Sheets

OTHER PUBLICATIONS

Scheduling in input-queued cell-based packet switches, Marsan, M.A. Bianco, A. Giaccone, P. Leonardi, E. Neri, F.; This paper appears in: Global Telecommunications Conference, 1999. GLOBECOM '99; Publication Date: 1999 vol. 2, On pp. 1227-1235 vol. 2 Meeting Date: Dec. 5, 1999-Dec. 9, 1999.*

"Conservative Synchronization Algorithms—Chapter 3"—pp. 51-91, 1999.

* cited by examiner

100

| LINE CARD | 118 |
| LINE CARD | 117 |
| LINE CARD | 116 |
| LINE CARD | 115 |
| SWITCH CARD | 120 |
| LINE CARD | 114 |
| LINE CARD | 113 |
| LINE CARD | 112 |
| LINE CARD | 111 |

FIG. 1

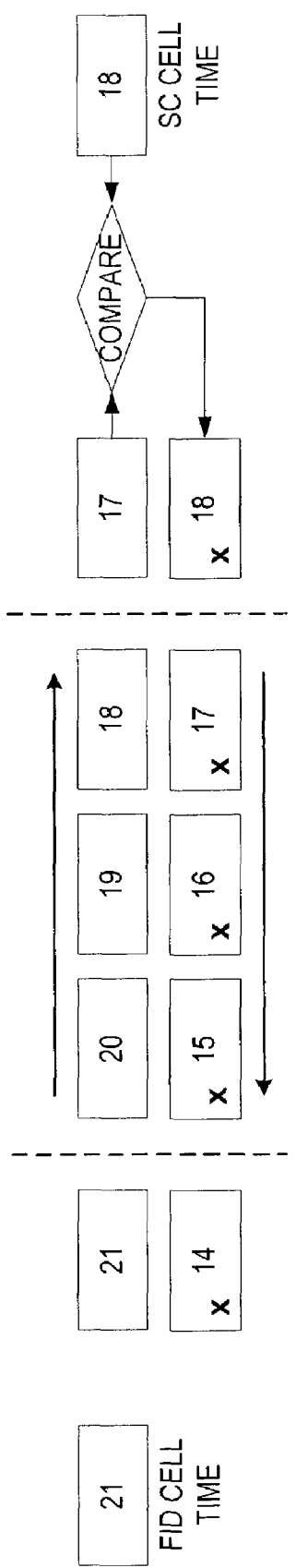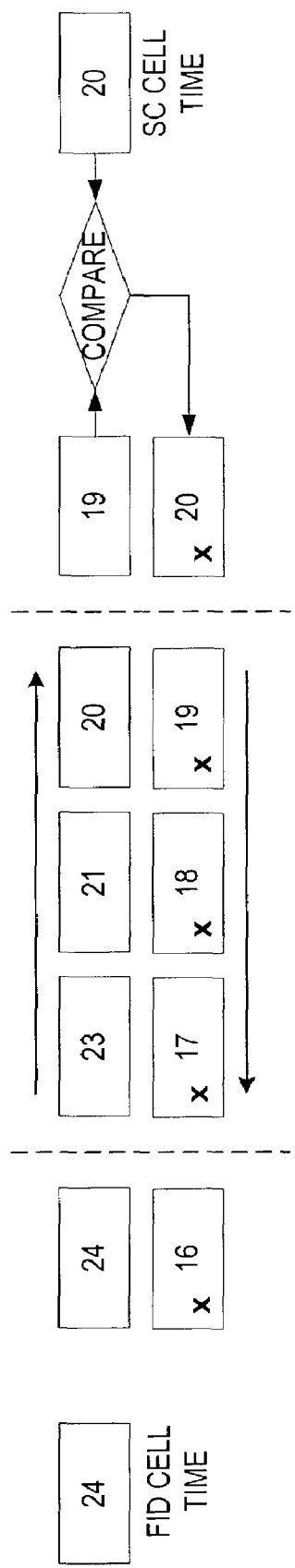
FIG. 5A
FIG. 5B

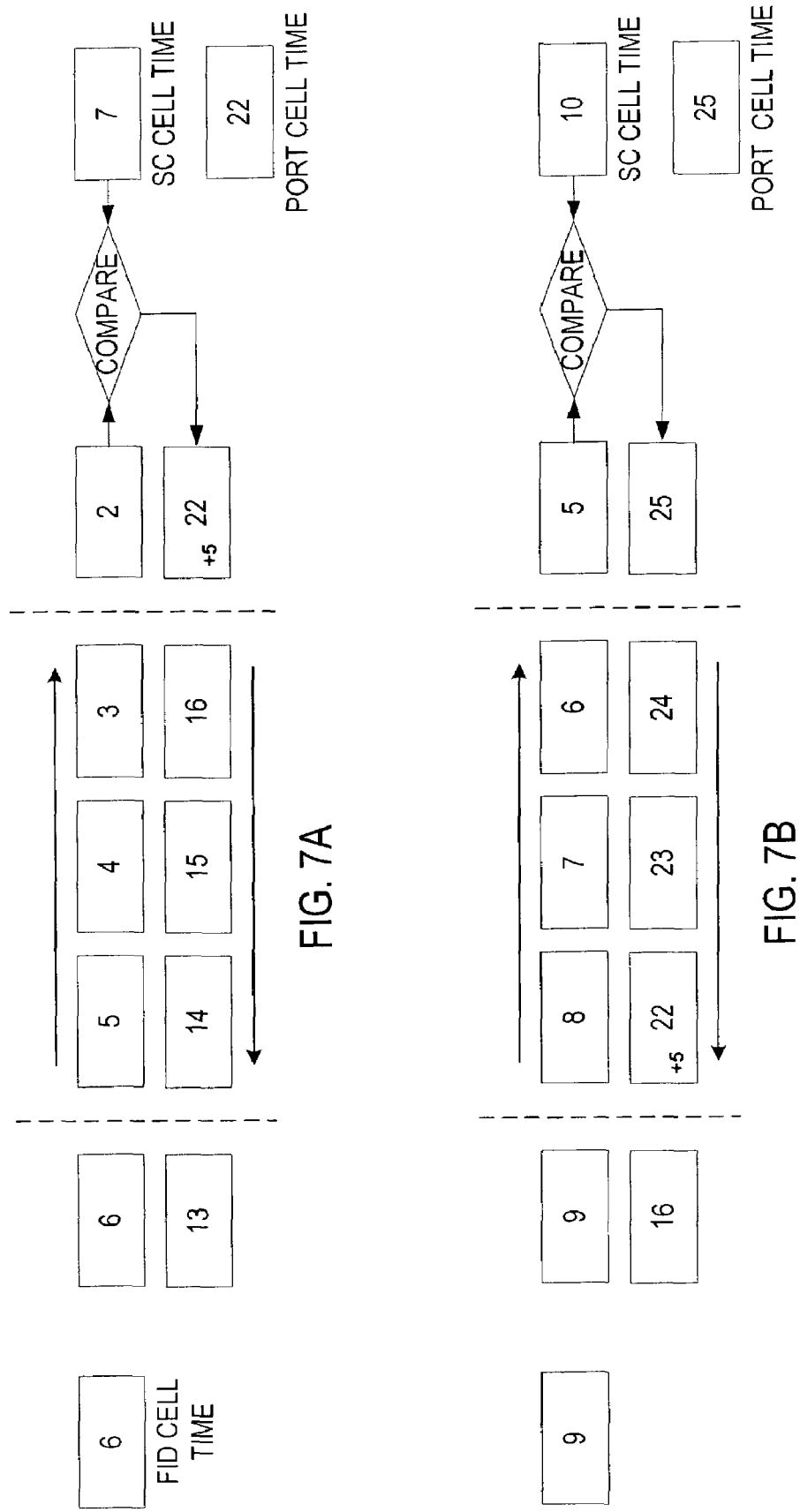

CELL SEQUENCE NUMBER SYNCHRONIZATION SYSTEM AND METHOD

BACKGROUND OF THE INVENTION

This invention relates generally to switching systems and methods, and more particularly to a system and method for enabling synchronization between an interface card and a switch.

A crossbar-based switching fabric is synchronous by nature. The switch includes a scheduler for controlling matches on the crossbar. The scheduler receives requests for connections through the crossbar, makes the matches through a grant/accept process, and aligns the crossbar for that match. The crossbar will stay aligned for one cell time. The cells that are to be switched through the crossbar must therefore be present at the crossbar at the precise time that the crossbar is aligned.

The switch card contains the crossbar that may be centrally located in the switching system. A conventional physical layout is shown in FIG. 1. As illustrated, switch 100 includes a chassis with a plurality of vertical line cards 111-118. The chassis is typically 19" wide. Depending on the location of switch card 120, the distance from any line card 111-118 to switch card 120 could be as short as 4" or as far as 19" direct line distance. The electrical trace distance, however, will be significantly longer as the signals are routed between line cards 111-118 and switch card 120 through a bus supported by a backplane in the chassis. As would be appreciated, the distance from any line card 111-118 to switch card 120 will typically be different.

The distance issue can be further complicated if the line card is located in a chassis separate from the switch card. In this arrangement, the interconnect link between the line cards and the switch card may be supported by an optical connection. A system diagram of an optical-interconnect implementation is illustrated in the example embodiment of FIG. 2.

As illustrated, optical-interconnect implementation 200 includes line cards 210 and 220. Line cards 210 and 220 further include opto-electrical converters (OECs) 212 and 222, respectively. Line cards 210 and 220 are interconnected to switch card 230 via optical links 240 and 250, respectively. Optical links 240 and 250 are terminated on switch card 230 through OEC 232. In various implementations, optical links 240 and 250 can span lengths of three feet to 1800 feet.

The potential of a significant length disparity between two separate links interconnected on the same switch card raises significant synchronization issues. These synchronization issues can be attributed at least in part to the transmission time of a bit on an optical link 240, 250. In general, the flight time can be on the order of one nanosecond per foot of optics. If the fiber length is 300 meters, then we could have 1.5 microseconds of delay for the bit stream. This 1.5 microseconds of delay can translate into a delay length that spans multiple cells. What is needed therefore is an efficient mechanism for accounting for the delay time on the link.

SUMMARY

The present invention provides a system and method for enabling the synchronization of a switch and an interface device. Based on a comparison of cell sequence numbers included in cells received from the interface device to a current cell time within the switch, cell time adjustment information can be transmitted to the interface device. The cell time adjustment information is used by the interface device to determine the cell sequence number that is included in cells transmitted to the switch.

BRIEF DESCRIPTION OF THE DRAWINGS

FIG. 1 illustrates an embodiment of a switch chassis with line cards.

FIGS. 5A-5D illustrate an embodiment of a cell sequence number synchronization process.

FIGS. 7A-7D illustrate an embodiment of a cell sequence number synchronization process.

DETAILED DESCRIPTION

An embodiment of the invention is discussed in detail below. While specific implementations of the invention are discussed, it should be understood that this is done for illustration purposes only. A person skilled in the relevant art will recognize that other components and configurations may be used without departing from the spirit and scope of the invention.

Large high-speed switches have too many ports to fit within one chassis or rack. A switch may be connected to an interface device through a link that has a substantial inherent delay characteristic. In typical routing arrangements, the time-of-flight delay between the interface device and the switch may easily span multiple cell times. Other interface devices in the same switching system may be in close proximity to the switch, and may therefore occur delays within one cell time. The switch schedules the transactions from port to port. In this process, the ports are expected to deliver their data to the switch at the correct time for the transaction.

Figure 2:
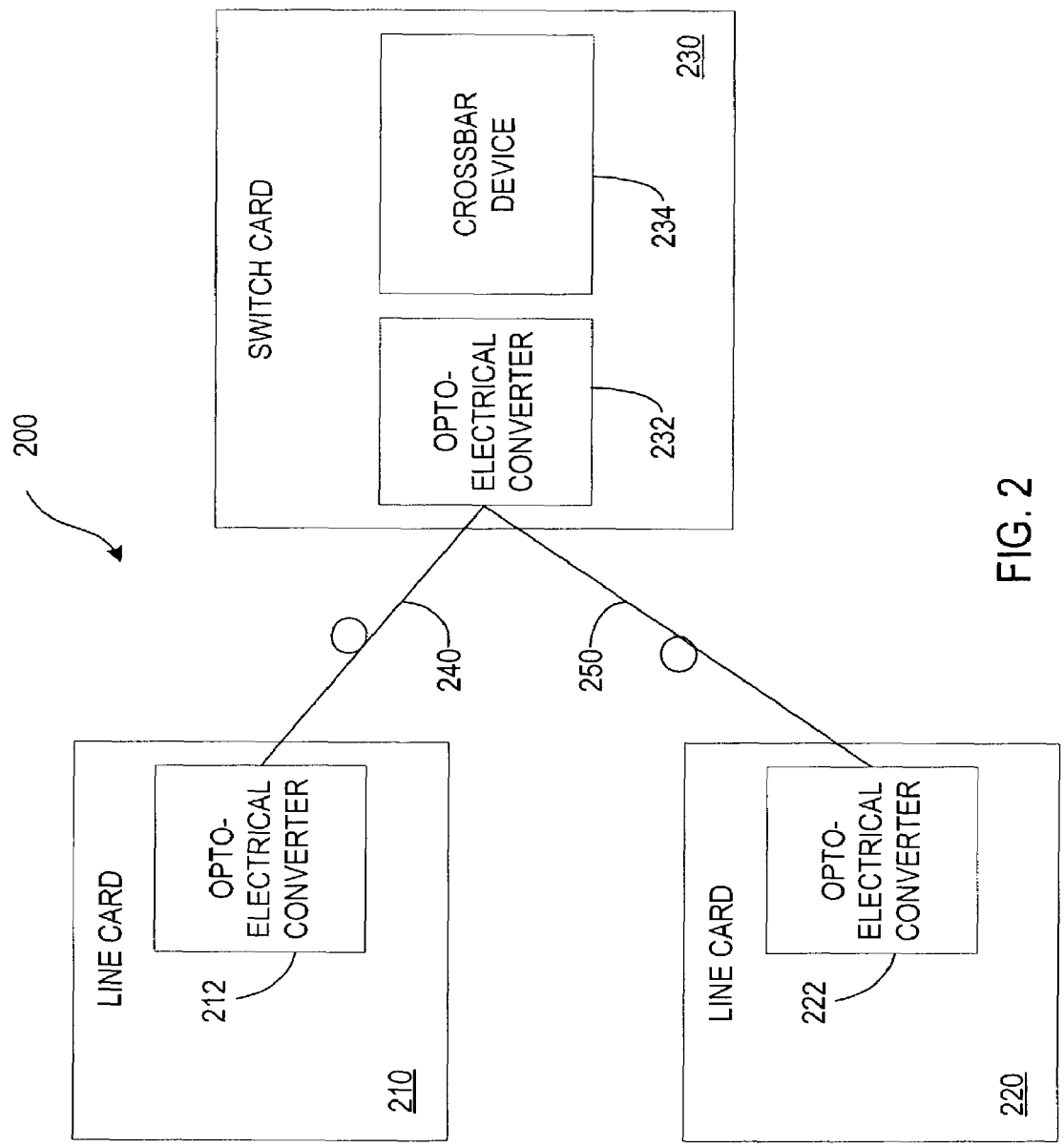
FIG. 2 illustrates an embodiment of an optical-interconnect switch implementation.
Figure 3:
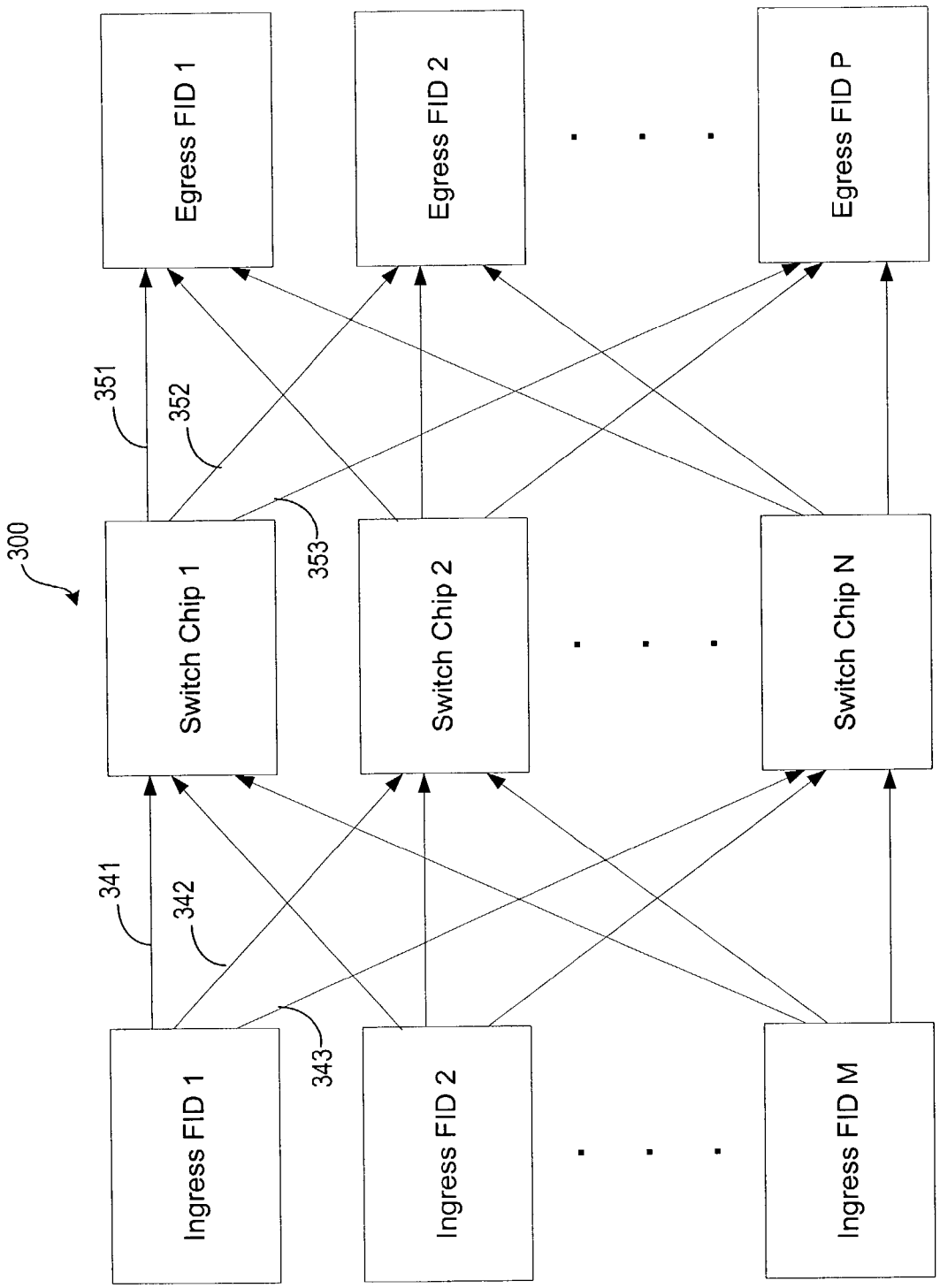
FIG. 3 illustrates an embodiment of a switch architecture.

An embodiment of a generic switch architecture is illustrated in FIG. 3. As illustrated, switch architecture 300 includes a plurality of ingress fabric interface devices (FIDs) 1-M, a plurality of switch chips 1-N, and a plurality of egress FIDs 1-P. In this arrangement, the various ports on ingress FIDs 1-M are connected to the various ports on egress FIDs 1-P via switch chips 1-N. For example, ingress FID 1 includes ports that are connected to switch chips 1, 2, and N via links 341, 342, and 343, respectively. Similarly, egress FID 1 includes ports that are connected to switch chips 1, 2, and N via links 351, 352, and 353, respectively.

Each of switch chips 1-N is operative to synchronize the passage of data from one of its ingress ports to one of its egress ports through a respective crossbar device. As noted, the crossbar device is synchronous by nature. Thus, each switch chip 1-N should ensure that the incoming cells are received at the particular point in time when the crossbar device is aligned for a scheduled match.

As would be appreciated, each switch chip 1-N is connected to a plurality of ingress FIDs 1-M, via a respective plurality of links. Each of these plurality of links can include a physical span of optical fiber that can range, for example, between lengths of three feet to 1800 feet. Variable amounts of delay can therefore be incurred across the plurality of optical links.

In one embodiment of the present invention, a FID can be synchronized to a switch chip through the adjustments of a cell sequence timer (or counter) residing in the FID. These adjustments are determined and controlled by a cell sequence number comparison, in the switch chip, between incoming cells from the FID and the cell sequence timer residing in the switch chip.

Figure 4A:
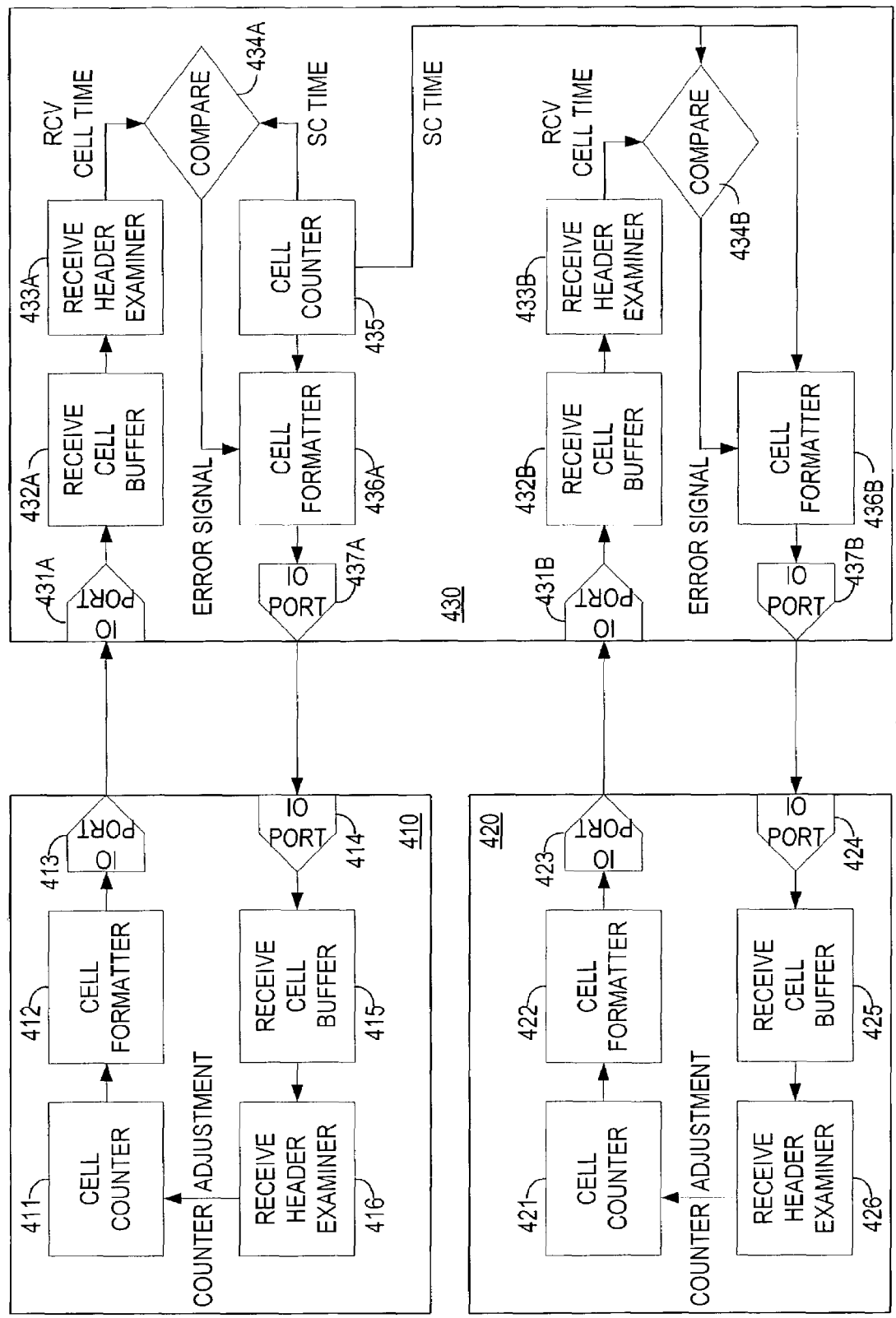
FIG. 4A illustrates an embodiment of a cell sequence number synchronization system.

FIG. 4A illustrates an embodiment of a system that enables a synchronization between a plurality of FIDs and a single switch chip. For simplicity and not by way of limitation, the illustrated embodiment of FIG. 4A includes only two FIDs 410 and 420 coupled to single switch chip 430. As would be appreciated, this switch arrangement could be duplicated across a plurality of switch chips when operating in the generic switch architecture illustrated in FIG. 3.

As illustrated in FIG. 4A, switch chip 430 includes two sets of input/output (I/O) ports that are connected to FIDs 410 and 420. More specifically, IO ports 413 and 414 of FID 410 are respectively coupled to IO ports 431A and 437A of switch chip 430, while IO ports 423 and 424 of FID 420 are respectively coupled to IO ports 431B and 437B of switch chip 430.

In operation, switch chip 430 receives a cell from FID 410 on IO port 431A, the received cell subsequently being placed in receive cell buffer 432A. Receive header examiner module 433A then proceeds to extract the cell sequence number from the header of the received cell. This cell sequence number is provided to compare element 434A. Compare element 434A compares the received cell sequence number to the current value of cell counter 435. In effect, this comparison determines whether the received FID cell time matches the switch chip cell time.

It should be noted that cell counter 435, as well as cell counters 411 and 421 in FIDs 410 and 420, respectively, can be embodied as a counter (or any other suitable timing element) that rolls over and starts again when it reaches a terminal count N. In various embodiments, the terminal count N can be programmable to values such as 16 or 32. In general, the size of the counter can be chosen based on considerations such as the expected range of delays within the switch architecture.

Returning to FIG. 4A, cell counter 435 within switch chip 430 also provides the current switch chip cell time to cell formatter 436A. Cell formatter 436A incorporates the current cell time within the outgoing cell that is provided to FID 410 via IO port 437A. Cell formatter 436A also incorporates information indicative of the results of compare element 434A.

In general, compare element 434A is operative to determine whether cells received from FID 410 are synchronized to cell counter 435. If the cell sequence number included in the received cell header matches the value of cell counter 435, then adjustments to cell counter 411 in FID 410 are not needed. If the cell sequence number included in the received cell header does not match the value of cell counter 435, the adjustments to cell counter 411 in FID 410 are needed.

In accordance with the present invention, these adjustments take the form of a counter adjustment control that is based on an error signal produced by compare element 434A. In one embodiment, the counter adjustment control is represented by a counter advance control that is operative to advance cell counter 411 in FID 410 by a fixed increment (e.g., one cell-time increment). As would be appreciated, in other embodiments, the counter adjustment control can be represented by a counter advance control that is operative to advance cell counter 411 by a variable increment that is based on the error signal produced by compare element 434A. In still further embodiments, the counter adjustment control can be represented by a counter advance/decrement control that is operative to advance/decrement cell counter 411 by a fixed or variable increment. As would be appreciated, the particular type of counter adjustment control signals will be implementation dependent and can be chosen based on considerations of complexity and speed of synchronization.

Based on the error signal, cell formatter 436A includes the counter adjustment control signal within the header of the cell to be transmitted to FID 410 via IO port 437A. After the transmitted cell is received by FID 410 at IO port 414, the received cell is then provided to receive cell buffer 415. Receive header examiner 416 then proceeds to extract the counter adjustment control signal from the header of the received cell. This counter adjustment control is then applied to cell counter 411. The output of the updated cell counter 411 is then provided as an input to cell formatter 412, which creates the cells to be transmitted to switch chip 430.

A person skilled in the art will appreciate that the functions described with reference to FIG. 4A, for example the receive cell buffer, receive header examiner, compare, cell counter, and cell formatter functions, may be alternatively implemented in hardware, firmware, or software.

Figure 4B:
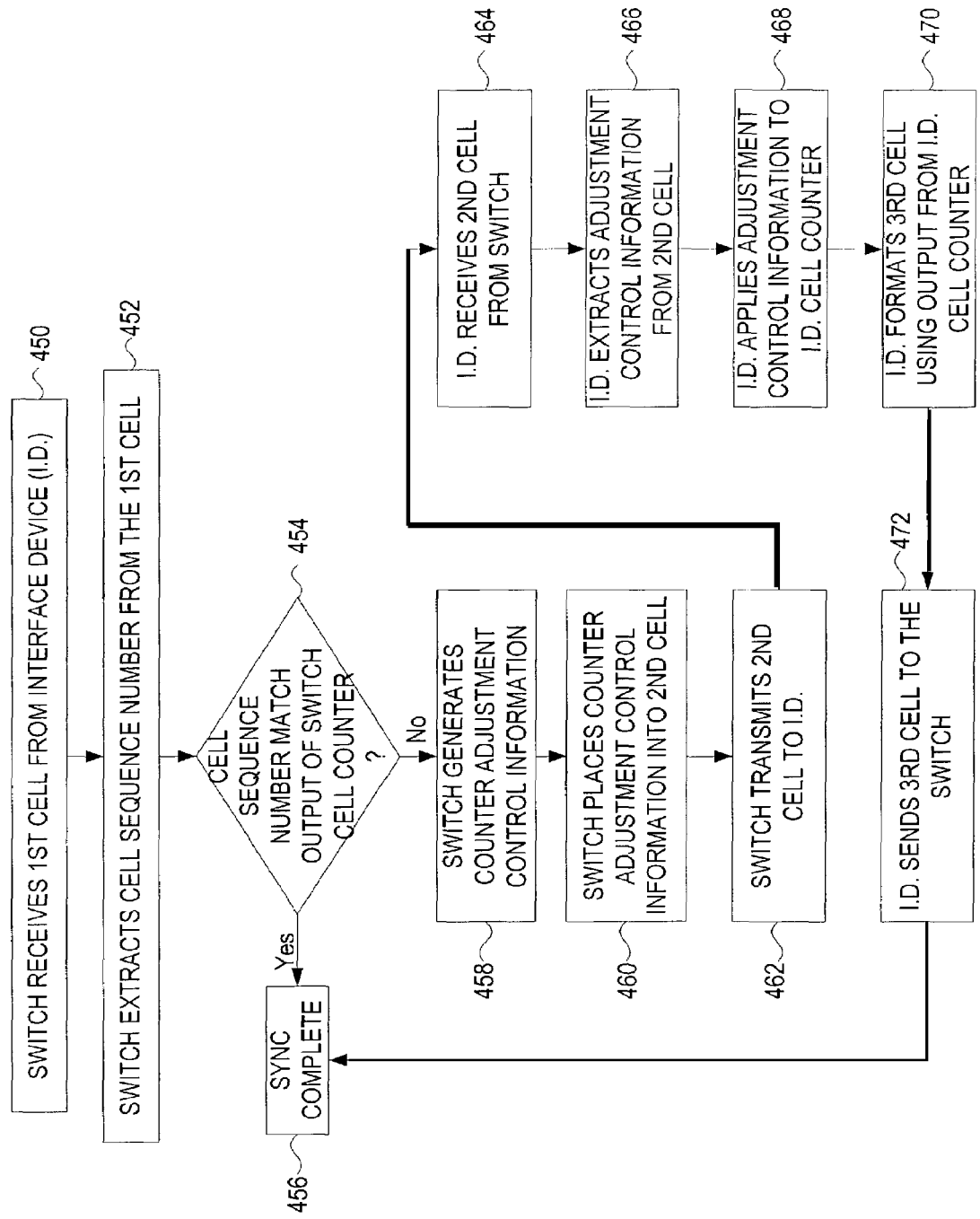
FIG. 4B is a flow diagram illustrating a synchronization process, according to an embodiment of the invention.

The general method described above is illustrated in FIG. 4B. As shown therein, the process may begin when a switch receives a first cell from an interface device (ID). The switch preferably extracts a cell sequence number from the first cell in step 452. In step 454, a switch preferably determines whether the cell sequence number matches an output of a switch cell counter. If there is a match, the process may advance to step 456 indicating that synchronization is complete. If, however, there is no match as determined in step 454, the switch may generate a counter adjustment control information in step 458. In one embodiment, the adjustment control information will adjust for a single cell time or sequence increment. In another embodiment, the adjustment control information will adjust for multiple cell times.

Subsequently, the switch preferably places the counter adjustment control information into a second cell in step 460, and transmits the second cell to the interface ID in step 462.

The interface device preferably receives the second cell from the switch in step 464 and extracts the adjustment control information from the second cell in step 456. The interface device preferably applies the adjustment control information to an interface device cell counter in step 468. In one embodiment, the counter is advanced by the adjustment control information; in another embodiment, the counter is retarded by the adjustment control information. Then, the interface device preferably formats a third cell using an output from the interface device cell counter in step 470, and sends the third cell to the switch in step 472.

Where the offset between the interface device and the switch is equal to the amount of the adjustment control information, the process will advance to step 456, where synchronization between the interface device and the switch is complete.

Figure 5C:
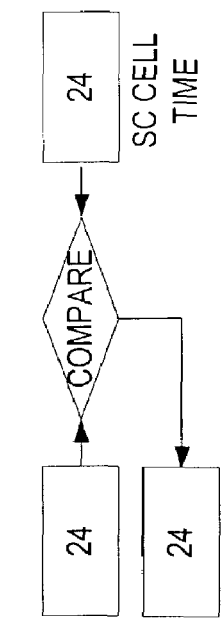

To more clearly illustrate the synchronization process described above, reference is now made to FIGS. 5A-5D, which illustrate the synchronization of FID 410 and switch chip 430 using a one-increment advance control. FIG. 5A illustrates the state of the process wherein the cell sequence numbers included in the headers of the cells being produced by FID 410 are one cell time out of sequence with the current switch chip cell time. In this illustration, the number that is included in each cell block represents the cell sequence number that is identified by information included within the corresponding cell header. In one embodiment, the cell sequence number is identified by a multi-bit word. In another embodiment, cell overhead can be reduced by identifying the cell sequence through a pseudo random sequence of bits. In this embodiment, one or more bits of the pseudo random sequence can be included in the cell header.

At the point in time illustrated by FIG. 5A, FID 410 has a current cell time of 21, which is included by cell formatter 412 into the cell to be transmitted to switch chip 430. As illustrated, cells bearing cell times 20, 19, and 18 are en route to switch chip 430 on the physical link. The cell bearing cell time 17, on the other hand, has been received by switch chip 430. After being extracted by receive header examiner 433A, cell time 17 is compared by compare element 434A to the current cell time (i.e., cell time 18) in switch chip 430. This comparison produces an error signal indicating that the cell time of the received cell time is one cell time behind the current cell time in switch chip 430. This error signal is then provided to cell formatter 436A, which includes a counter advance control signal into the cell header of the outgoing cell.

In FIGS. 5A-5D, the presence of a counter advance control signal is illustrated by an "x" in the corresponding illustrations of a cell block. As would be appreciated, the principles of the present invention are not dependent on the specific form of the counter adjustment control signal in the cell header.

At the point in time illustrated by FIG. 5A, switch chip 430 has produced counter advance control signals for the last five cells (i.e., cell times 14-18). The first cell (i.e., cell time 14) that includes a counter advance control signal has reached FID 410. At this point, FID 410 would then advance its cell counter 411 by one cell time in addition to its normal cell counter increment.

The effect of the counter advance control signal is illustrated in FIG. 5B. At this point in time (two cell times later then FIG. 5A), the effect of the counter advance control signal can be seen in the cells created after the transmission of the cell at FID cell time 21. Instead of cell time 22, the cell following cell time 21 includes cell time 23. Cell time 23 is the result of the one-count increment of cell counter 411 of FID 410. As the cells that include the adjusted FID cell time have not yet reached switch chip 430, switch chip 430 continues to include counter advance control signals in its outgoing cells. In general, after FID 410 has acted upon the first counter advance control signal, FID 410 will ignore the additional counter advance control signals for at least the amount of time representative of the round-trip delay.

In FIG. 5C, the effect of the FID cell counter adjustment has been received by switch chip 430. At this point in time (four cell times later then FIG. 5B), the cell sequence numbers of the received cells now match the values of cell counter 435 of switch chip 430. Beginning with cell time 23, switch chip 430 therefore stops producing cells that include counter advance control signals.

Figure 5D:
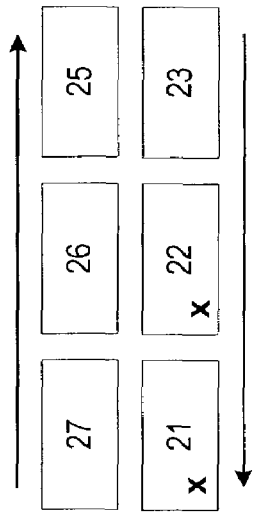

As illustrated in FIG. 5D, the resulting system is now synchronized as FID 410 has ignored all of the additional counter advance control signals that were received within the span of time attributed to the round-trip delay.

As thus described, a FID can be synchronized to a switch chip using counter adjustment control signals produced by the switch chip. Here, it should be noted that each FID can be independently synchronized to the switch chip. This independent synchronization process can account for the different delays that are produced by links of different lengths.

As illustrated in FIG. 4A, switch chip 430 includes a single cell counter 435 that is used to synchronize multiple ports. This single cell counter 435 is used to generate counter adjustment control signals for FIDs 410 and 420 that are coupled to switch chip 430. In this embodiment, the cell counters in FIDs 410, 420 will be adjusted through the counter adjustment control signals on the respective links to synchronize FIDs 410, 420 to a common cell counter in switch chip 430.

As would be appreciated, the embodiment described above will typically involve multiple sequential adjustments of the FID cell counter before the FID produces cell sequence numbers that are received in synchronization with the switch chip cell time. Each of these multiple sequential adjustments will require a round-trip delay before the next adjustment can be made. The multiple round-trip delays will consequently produce a lengthy synchronization process.

Figure 6A:
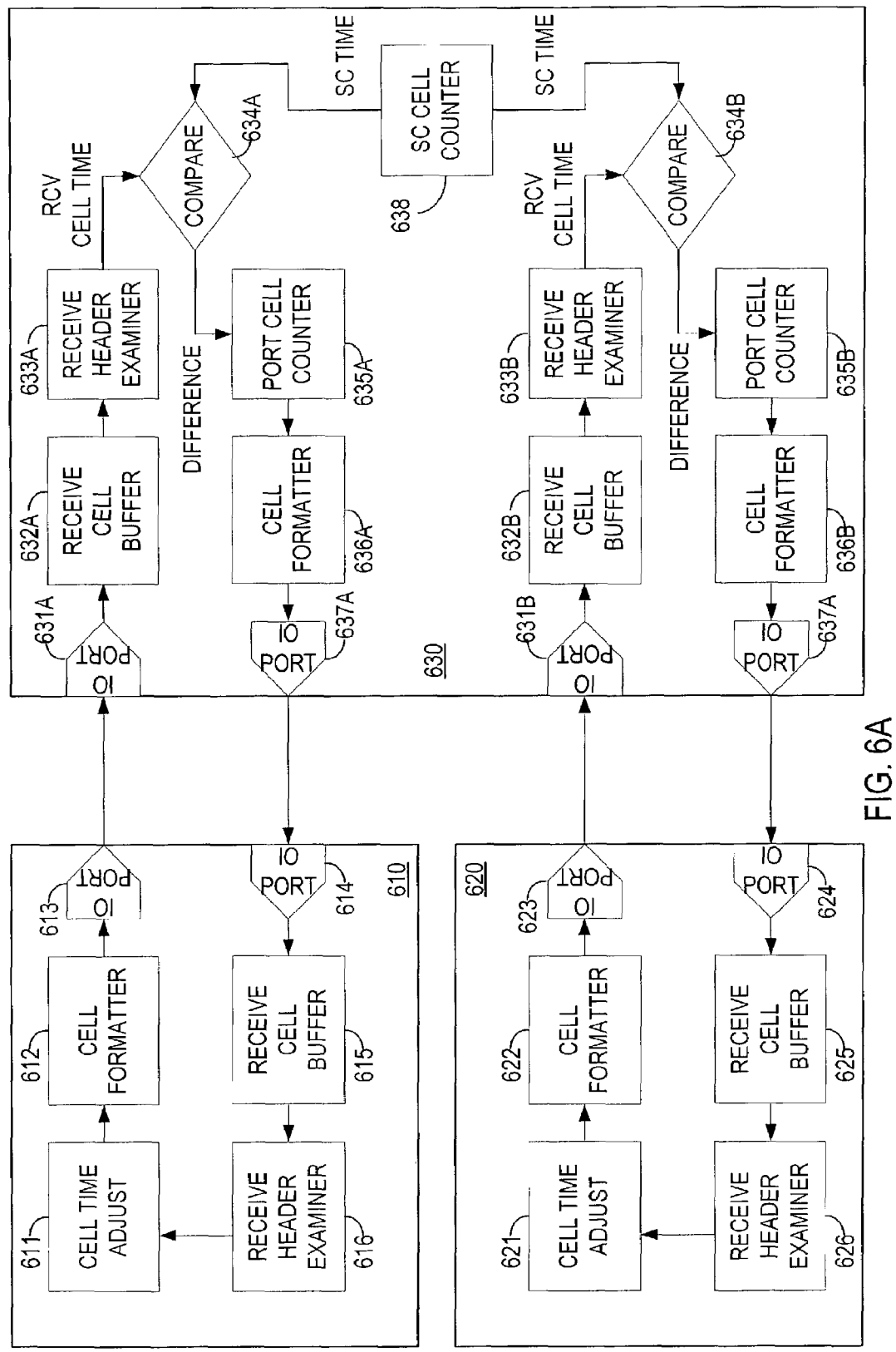
FIG. 6A illustrates an embodiment of a cell sequence number synchronization system.

In another embodiment of the invention, synchronization between the FIDS and the switch chips can be effected through a single round-trip adjustment. In this embodiment, the switch chip includes separate cell counters for each of the FIDs with which it is connected. FIG. 6A illustrates the components that enable a single round-trip adjustment between a plurality of FIDs and a single switch chip. Again, as would be appreciated, this arrangement would be duplicated across a plurality of switch chips when operating in the generic switch architecture illustrated in FIG. 3.

In the illustrated embodiment of FIG. 6A, each FID 610 and 620 will use the cell sequence number in the cell received from switch chip 630 for sending cells back to switch chip 630, minus a fixed offset. In one embodiment, this offset is the time it takes the FID to process an accept and dispatch the cell. For example, assume that it takes a FID seven cells to process an accept. Thus, if the FID is receiving a cell having cell sequence number 21, it is dispatching a cell having cell sequence number 14.

In this environment, the switch chip will compare the sequence numbers it receives from the FID to the current cell time of the switch chip. If adjustments are required, the switch chip can take the difference between the cell sequence numbers, calculate the adjustment, and adjust the outgoing cell sequence number.

More specifically with reference to FIG. 6A, switch chip 630 receives a cell from FID 610 on IO port 631A, the cell subsequently being placed in receive cell buffer 632A. Receive header examiner module 633A then proceeds to extract the cell sequence number from the header of the received cell. This cell sequence number is provided to compare element 634A. Compare element 634A compares the received cell sequence number to the current time as recorded in switch chip cell counter 638. The comparison is used to generate a difference signal representing the difference between the current value of switch chip cell counter 638 and the received cell sequence number. This difference signal is used to adjust the value of port cell counter 635A.

In one embodiment, compare element 634A determines how many cell times the received cell sequence number is lagging the current switch chip cell time. This cell-time difference is added to the current value of port cell counter 635A as modulo N, where N is the terminal count of the cell counters. Note that adjustments based on the difference signal generated by compare element 634A are applied to port cell counter 635A, not switch chip cell counter 638. The adjusted value of port cell counter 635A is then provided to cell formatter 636A. Cell formatter 636A will then proceed to incorporate the adjusted value of port cell counter 635A within the outgoing cell header that is provided to FID 610 via 10 port 637A.

After the transmitted cell is received by FID 610 at IO port 614, the received cell is then provided to receive cell buffer 615. Receive header examiner 616 then proceeds to extract the cell sequence number from the header of the received cell. This cell sequence number is provided to cell time adjust module 611. Cell time adjust module 611 subtracts the fixed offset from the received cell sequence number and provides the resulting cell time as an input to cell formatter 612. Cell formatter 612 then creates the cells to be transmitted to switch chip 630.

In this illustrated embodiment, FID 610 does not include its own counter. Rather, the timing is controlled by port cell counter 635A resident in switch chip 630. In an alternative embodiment, FID 610 includes its own counter that is adjusted in response to received cell sequence numbers or to a counter adjustment signal.

A person skilled in the art will appreciate that the functions described with reference to FIG. 6A, for example the receive cell buffer, receive header examiner, compare, SC cell counter, port cell counter, cell time adjust and cell formatter functions, may be alternatively implemented in hardware, firmware, or software.

Figure 6B:
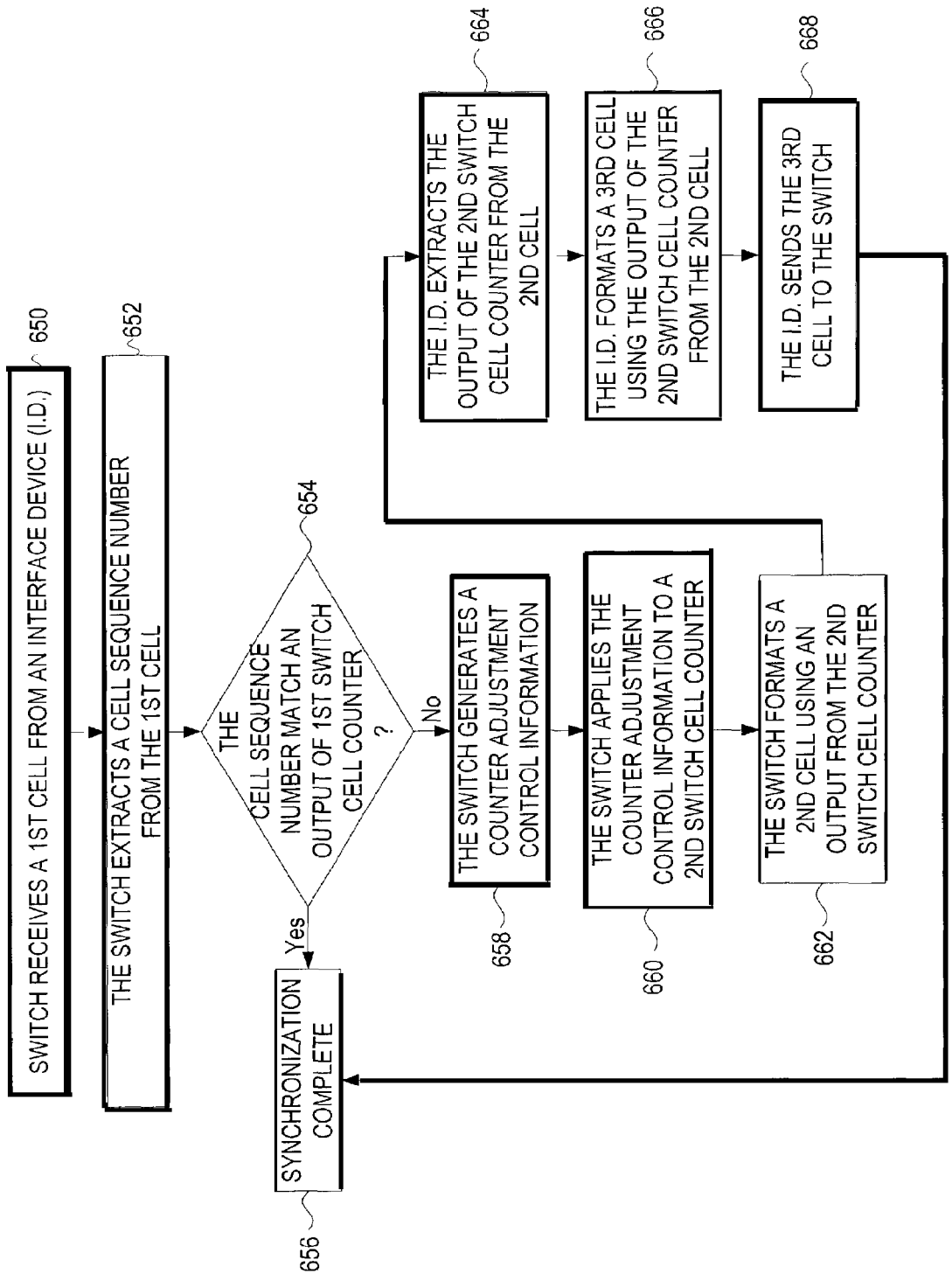
FIG. 6B is a flow diagram illustrating a synchronization process, according to an embodiment of the invention.

FIG. 6B is a flow diagram illustrating a synchronization process, according to an embodiment of the invention. In step 650, a switch receives a first cell from an interface device (ID). In step 652, the switch preferably extracts a cell sequence number from the first cell. Then, in step 654, a decision is made regarding whether the cell sequence number matches an output of a first switch cell counter. If there is a match, then the process preferably advances to step 656, where synchronization between the interface device and the switch is complete. If there is not a match, then the switch preferably generates a counter adjustment control information in step 658. Subsequently, the switch preferably applies the counter adjustment control information to a second switch cell counter in step 660 and formats a second cell using an output from the second switch cell counter. The adjustment control information may represent a single cell time or multiple cell times, and the effect on the second switch cell counter may be to either advance or retard the second switch cell counter.

The ID preferably extracts the output of the second cell counter from the second cell in step 664. Then, the ID preferably formats a third cell using the output of the second switch cell counter from the second cell in step 666, and sends the third cell to the switch in step 668. As a result, the process advances to step 656, where synchronization between a switch and a interface device is complete.

Figure 7C:
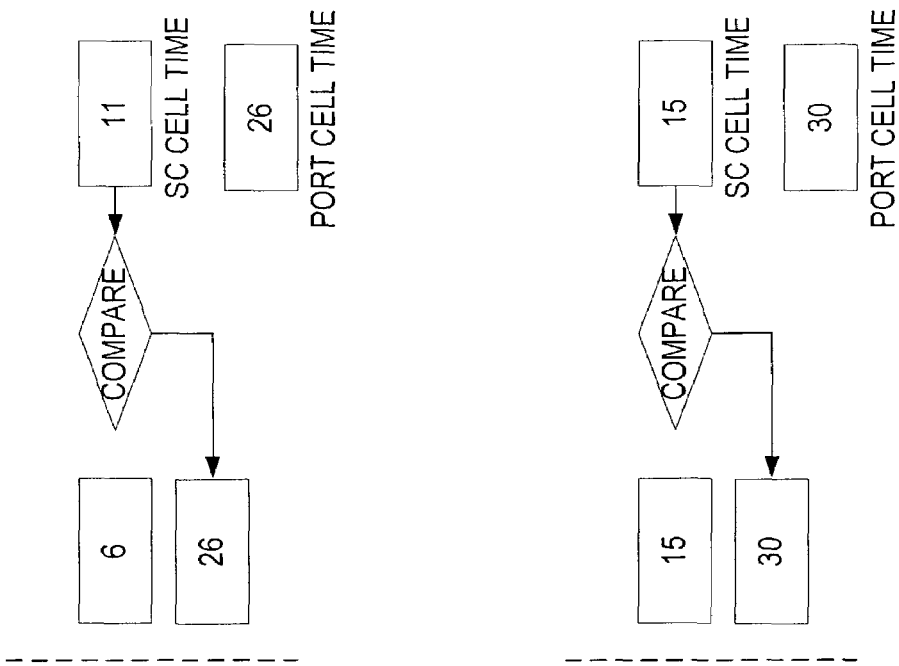

To more clearly illustrate an embodiment of the synchronization process discussed above, reference is now made to FIGS. 7A-7D, which illustrate the synchronization of FID 610 and switch chip 630 using updated cell sequence numbers in the cell header. FIG. 7A illustrates the state of the process where the cell sequence numbers included in the headers of the cells being produced by FID 610 are five cell times out of sequence with the current switch chip cell time.

At the point in time illustrated by FIG. 7A, FID 610 has a current cell time of 6, which is included by cell formatter 612 into the cell to be transmitted to switch chip 630. As illustrated, cells bearing cell times 5, 4, and 3 are en route to switch chip 630 on the physical link, while the cell bearing cell time 2 has been received by switch chip 630.

After being extracted by receive header examiner 633A, received cell time 2 is compared by compare element 634A to the current cell time (i.e., cell time 7) in switch chip 630. This comparison produces a difference signal that indicates the difference between the two cell times being compared.

The difference signal is then provided to port cell counter 635A, which is responsible for providing the cell sequence numbers for the cells that are transmitted on the outgoing port to FID 610. Port cell counter 635A uses the difference signal to adjust the value of port cell counter 635A. In the present example, the value of port cell counter 635A prior to the determination of the difference signal by compare element 634A was cell time 17. With the difference signal, however, the value of port cell counter 635A is advanced five cell times. The new value of port cell counter 635A is therefore 22.

As further illustrated in FIG. 7A, the cell bearing cell time 22 is further annotated with the notation "+5". This annotation is used simply for illustration purposes to identify the cell that incorporates the cell sequence number generated by an adjustment to port cell counter 635A.

FIG. 7B illustrates the point in time that is three cell times after that illustrated in FIG. 7A. Here, the transmitted cells (i.e., cells 22-25) that include the post-adjustment values of port cell counter 635A have yet to reach FID 610. Here, it should be noted that compare element 634A is still generating difference signals due to the lack of synchronization between the cell times of the received cells as compared to the current cell time of switch chip 630. These difference signals do not produce further adjustments to port cell counter 635A, however, since the effect of the adjustment to port cell counter 635A has not yet been seen. In general, switch chip 630 will ignore these additional difference signals for at least the amount of time representative of the round-trip delay.

The effect of the adjustment to port cell counter 635A is illustrated in FIG. 7C. At this point in time (one cell time later then FIG. 7B), the effect of the adjustment to port cell counter 635A can be seen in the cells created after FID 610 receives the cell having cell time 22. After cell sequence number 22 is extracted by receive header examiner 616, cell time adjust module 611 generates an adjusted cell sequence number. Specifically, cell time adjust module 611 takes the received cell sequence number and subtracts the offset to yield the adjusted FID cell sequence number, i.e., 22 minus 7 resulting in 15. The new value 15 is then provided to cell formatter 612 in the creation of new cells to be transmitted to switch chip 630. As illustrated, the cell having cell time 15, in effect, has been advanced five additional cell times relative to the previously created cell having cell time 9.

Figure 7D:
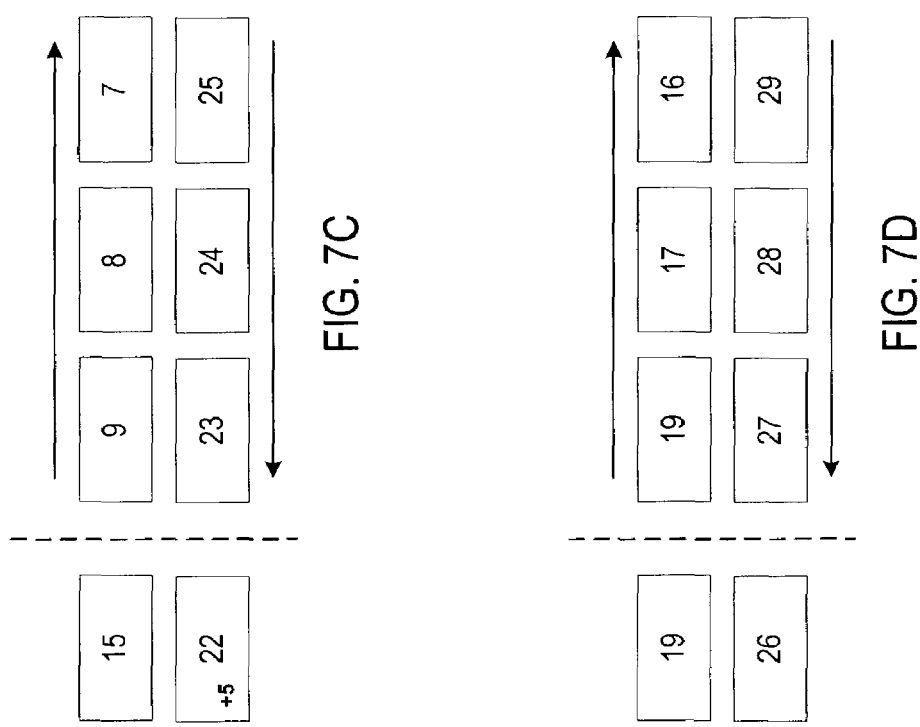

In FIG. 7D, the effect of the adjustment to cell counter 611 has been received by switch chip 630. At this point in time (four cell times later then FIG. 7C), the cell sequence numbers of the received cells now match the values of cell counter 638 of switch chip 630. FID 610 and switch chip 630 are now synchronized.

As illustrated, the synchronization process of this embodiment enables a FID and a switch chip to achieve synchronization within a single round trip. This rapid synchronization can be applied independently to each of the FIDs that are coupled to a particular switch chip. As illustrated in FIG. 6A, switch chip 630 includes a separate port cell counter for each port, thereby enable the independent synchronization to a common cell counter in the switch chip.

As thus described, the principles of the present invention as exemplified by the embodiments described above enable various benefits, including easy scalability through independent port synchronization. Additionally, the principles of the present invention enable flexible switch architectures that incorporate port arrangements with independent time-of-flight delays.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for synchronizing cell times between a switch and an interface device, comprising:
receiving a first cell at said switch from said interface device, said first cell including information identifying a first cell sequence number;
comparing said first cell sequence number to a value of a cell sequence counter within said switch, defining a comparison;
transmitting a second cell to said interface device, said second cell including counter adjustment control information that is based on said comparison, wherein said counter adjustment control information is used by said interface device to determine a second cell sequence number that is included in a third cell; and
transmitting said third cell from said interface device to said switch, with said second sequence number being based on a value of a cell sequence counter within said interface device, said value of said cell sequence counter within said interface device being adjusted at least one cell time increment by said counter adjustment control information.

2. The method of claim 1 wherein said counter adjustment control information represents a plurality of cell times.

3. The method of claim 1 wherein said value is advanced by said counter adjustment control information.

4. The method of claim 1 wherein said value is retarded by said counter adjustment control information.

5. The method of claim 1, wherein one of said first and second cell sequence numbers comprise a multi-bit word.

6. The method of claim 1, wherein one of said first and second cell sequence numbers comprise at least one pseudo random sequence bit.

7. A system for synchronizing cell times between a switch and an interface device, comprising:
a switch cell counter;
a compare element, said compare element being operative to compare a cell time identified by information included in a cell received from said interface device and a value of said switch cell counter, defining a comparison, with said comparison being used to generate cell time adjustment information;
an interface cell counter within said interface device coupled to receive said cell time adjustment information and generate an adjusted count based on said cell time adjustment information one cell time; and
an interface cell formatter in said interface device coupled to receive said adjusted count and generate a cell sequence number for cells transmitted to said switch based on said adjusted count.

8. The system of claim 7, further including a cell formatter in said switch coupled to receive said cell time adjustment information and configured to transmit said cell time adjustment information with cells transmitted to said interface device.

9. The system of claim 7, wherein said cell time adjustment information is used to adjust said interface cell counter by a plurality of cell times.

10. The system of claim 7, wherein said cell time adjustment information is used to retard said interface cell counter.

11. A synchronization method between a switch and an interface device, comprising:
receiving a first cell at said interface device that includes cell time adjustment information;
determining an updated cell time within said interface device based on said cell time adjustment information by adjusting a cell sequence counter within said interface device by one cell time;
transmitting a second cell to said switch, said second cell including said updated cell time that includes a first cell sequence number based upon said updated cell time;
comparing said first cell sequence number to a value of a cell sequence counter within said switch, defining a comparison;
transmitting a third cell to said interface device, said third cell including counter adjustment control information that is based on said comparison, wherein said counter adjustment control information is used by said interface device to determine a second cell sequence number that is included in a fourth cell; and
transmitting said fourth cell from said interface device to said switch, with said second cell sequence number being based on a value of said cell sequence counter within said interface device, said value of said cell sequence counter within said interface device being adjusted at least one cell time increment by said counter adjustment control information.

12. The method of claim 11 wherein said adjusting comprises adjusting said cell counter by a plurality of cell times.

13. The method of claim 11 wherein determining further includes advancing said cell counter.

14. The method of claim 11 wherein determining further includes retarding said cell counter.

15. The method of claim 11 determining further comprises subtracting an offset from a cell sequence number identified in said first cell.

16. A synchronization system, comprising:
a switch having a switch cell counter and a compare element;
an interface device including a receive header examiner that extracts cell time adjustment information from a first cell received from a switch, an interface cell counter and an interface cell formatter, with said compare element being operative to compare a cell time identified by information included in an initial cell received from said interface device and a value of said switch cell counter, defining a comparison, with said comparison being used to generate said cell time adjustment information, said interface cell counter being coupled to receive said cell time adjustment information and generate an adjusted count based on said cell time adjustment information one cell time and generate a cell sequence number, based on said adjusted count, for cells to be transmitted to said switch.

17. The method of claim 16 wherein said cell time adjustment information is used to adjust said interface cell counter by a plurality of cell times.

18. The method of claim 16 wherein said cell time adjustment information is used to advance said interface cell counter.

19. The method of claim 16 wherein said cell time adjustment information is used to retard said interface cell counter.

20. The method of claim 16 wherein said cell time adjustment information is information identifying a cell time of said first cell, and said cell time of said second cell is determined by subtracting an offset from said cell time of said first cell.

21. A synchronization method in a system including a switch and an interface device, wherein said interface device transmits cells to said switch that include a cell sequence number reflective of a value of a cell counter in said interface device, comprising:

determining whether one of said cells received in said switch includes a first cell sequence number that matches a current cell time within said switch by comparing said first cell sequence number to said a value of a cell sequence counter within said switch, defining a comparison;

transmitting cell time adjustment information to said interface device upon first cell sequence number in said one of said cells failing to match said current cell time within said switch by transmitting an additional cell from said switch to said interface device, said additional cell including counter adjustment control information that is based on said comparison, wherein said counter adjustment control information is used by said interface device to determine an additional cell sequence number that is included in a third cell; and transmitting said third cell from said interface device to said switch, with said second sequence number being based on a value of an interface cell sequence counter within said interface device, said value of said interface cell sequence counter being adjusted at least one cell time increment by said counter adjustment control information.

22. The method of claim 21, wherein said cell sequence number comprises a multi-bit word.

23. The method of claim 21, wherein said cell sequence number comprises at least one pseudo random sequence bit.

* * * * *